(12) United States Patent
Gupta et al.

(10) Patent No.: US 8,417,696 B2
(45) Date of Patent: Apr. 9, 2013

(54) CONTACT INFORMATION MERGER AND DUPLICATE RESOLUTION

(75) Inventors: Amit Gupta, Bellevue, WA (US); Cindy Kwan, Bellevue, WA (US); Nikhil P. Bobde, Bellevue, WA (US); Setty Venkateshaiah, Redmond, WA (US); Ye Tian, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 183 days.

(21) Appl. No.: 12/813,232

(22) Filed: Jun. 10, 2010

(65) Prior Publication Data

US 2011/0307455 A1 Dec. 15, 2011

(51) Int. Cl.
*G06F 17/00* (2006.01)
(52) U.S. Cl. ........ 707/729; 707/723; 707/830; 707/793; 707/955; 707/922
(58) Field of Classification Search .................. 707/723, 707/729, 755, 793, 830, 922, 955
See application file for complete search history.

(56) References Cited

U.S. PATENT DOCUMENTS

| | | | |
|---|---|---|---|
| 7,360,172 B2 | 4/2008 | Grossman et al. | |
| 7,360,174 B2 | 4/2008 | Grossman et al. | |
| 7,480,664 B2 | 1/2009 | Dunn et al. | |
| 2006/0085483 A1 | 4/2006 | Mooney et al. | |
| 2006/0184584 A1 | 8/2006 | Dunn et al. | |
| 2007/0041571 A1* | 2/2007 | Chatterjee et al. | 379/355.02 |
| 2008/0253544 A1 | 10/2008 | Brown et al. | |
| 2009/0106369 A1 | 4/2009 | Chen et al. | |
| 2009/0131028 A1 | 5/2009 | Horodezky et al. | |
| 2010/0082735 A1* | 4/2010 | Petersen et al. | 709/203 |
| 2010/0330972 A1* | 12/2010 | Angiolillo | 455/418 |

OTHER PUBLICATIONS

Madnick, et al., "Improving the Quality of Corporate Household Data: Current Practices and Research Directions", Retrieved at << http://web.mit.edu/tdqm/www/tdqmpub/CorporateHouseholdNov01.pdf >>, Proceedings of the 6th International Conference on Information Quality, 2001, pp. 92-104.

* cited by examiner

*Primary Examiner* — Sana Al Hashemi
(74) *Attorney, Agent, or Firm* — Turk IP Law, LLC (57) ABSTRACT

Merger and duplicate resolution for contact information across platforms is managed employing contact objects and aggregating the contact objects into contact models. Contact data from internal and/or external data stores may be retrieved and contact objects created for each contact from each contact store. A contact model for each contact entity may be created by aggregating contact data from contact objects across the contact stores. The aggregation may include duplicate resolution through weighting of communication system types, ranking of contact information type, and similar approaches. The contact models may be dynamically updated based on changes to the contact objects.

15 Claims, 7 Drawing Sheets

CONTACT INFORMATION MERGER AND DUPLICATE RESOLUTION

BACKGROUND

Contemporary communication systems enable users to have a number of identities over various systems such as enterprise emails, personal emails, social networking exchanges, and comparable ones. Each of these systems may generate contact lists based on automatic processing of exchange information and/or manual input. A structure and content of contact information for distinct communication systems may be different depending on their infrastructure. Thus, a user may have a plurality of contact information for the same contact stored in each communication system they are associated with.

Increasingly, communication other applications are becoming capable of providing access to multiple communication systems for a user. For example, an electronic mail exchange application may be configured to send and receive emails from a variety of systems for a user managing the user's identities automatically. Because each communication system tends to have its own contact store, it is a challenge for users to managing multiple contact stores while using multiple communication clients. Some of the issues in keeping multiple contact stores include: managing synchronization, synchronizing across multiple platforms, updating contact information content for various contact stores, and managing duplicate contact information.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to managing merger and duplicate resolution for contact information across platforms. Contact data from internal and/or external data stores may be retrieved and contact objects created for each contact from each contact store. Next, a contact model may be created for each contact entity by aggregating contact data from contact objects across the contact stores. The aggregation may include duplicate resolution through weighting of communication system types, ranking of contact information type, and similar approaches. The contact models may be dynamically updated based on changes to the contact objects.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, merger and duplicate resolution for contact information across platforms may be managed by creating contact objects for each contact from a data store associated with a user and aggregating the contact objects for the same contact entity into a contact model employing aggregation approaches like weighting communication system types or ranking contact information types. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in the limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "server" generally refers to a computing device executing one or more software programs typically in a networked environment. However, a server may also be implemented as a virtual server (software programs) executed on one or more computing devices viewed as a server on the network. Similarly, a "client" may refer to a computing device enabling access to a communication system or an application executed on a computing device enabling a user to access a networked system such as a social networking service, an email exchange service, and comparable ones. More detail on these technologies and example operations is provided below.

Figure 1:
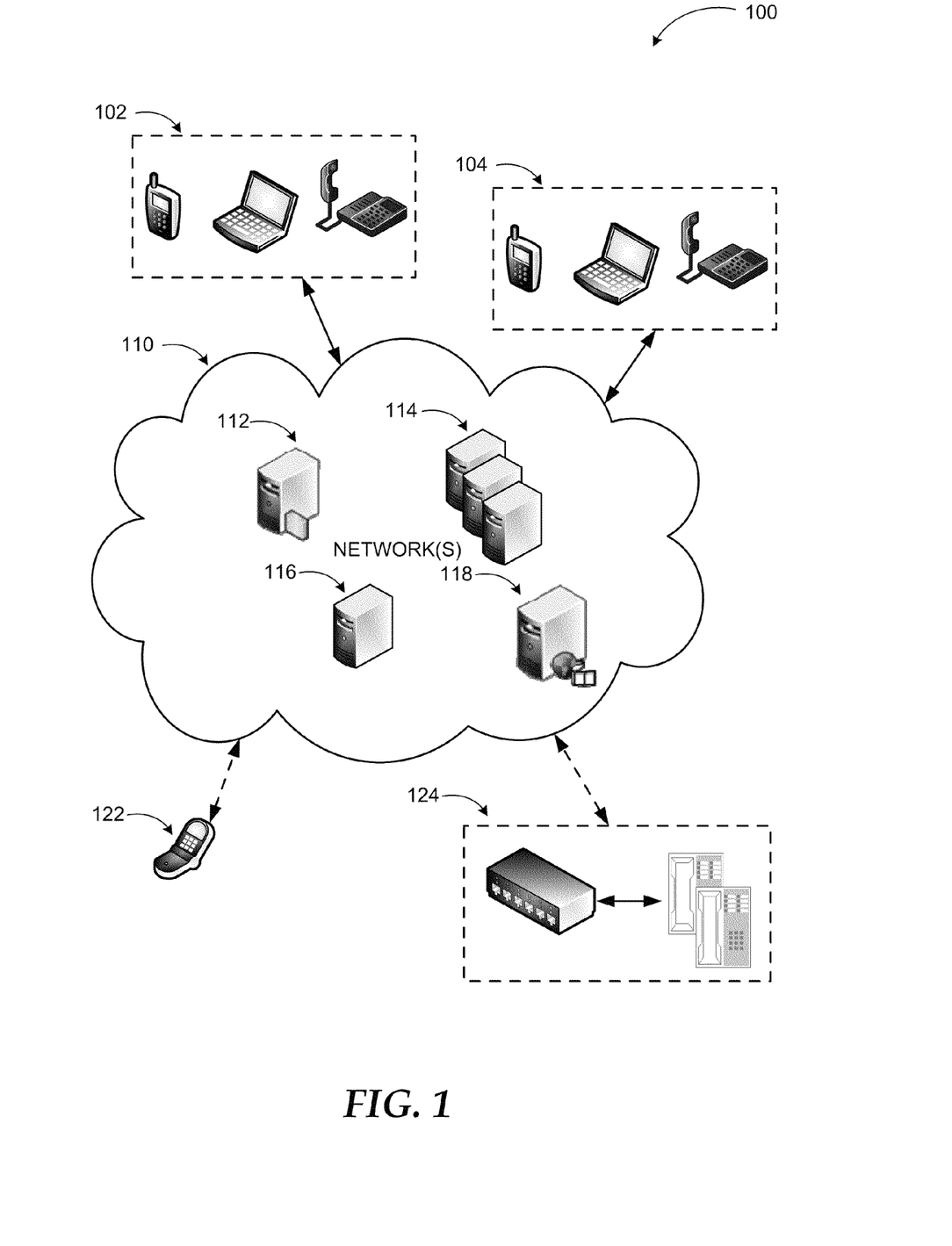
FIG. 1 is a diagram illustrating an example communications system, where embodiments may be implemented for managing contact information.

Referring to FIG. 1, diagram 100 of an example communications system, where embodiments may be practiced, is illustrated. Enhanced communication systems such as a unified communication system provide subscribers the ability to facilitate multi-modal communications. While such systems may integrate various aspects of multi-modal communications such as contact information management, subscribers may also participate in other systems such as social networking systems, other email systems, and similar ones. Thus, an enhanced communication system may provide a suitable platform for merging (and duplicate resolution) contact information associated with a subscriber across various platforms. A unified communication system is an example of modern communication systems with a wide range of capabilities and services that can be provided to subscribers. A unified communication system is a real-time communications system facilitating instant messaging, presence, audio-video conferencing, web conferencing functionality, and comparable capabilities.

In a unified communication ("UC") system such as the one shown in diagram 100, users may communicate via a variety of end devices (102, 104), which are client devices of the UC system. Each client device may be capable of executing one or more communication applications for voice communication, video communication, instant messaging, application sharing, data sharing, and the like. In addition to their advanced functionality, the end devices may also facilitate traditional phone calls through an external connection such as through PBX 124 to a Public Switched Telephone Network ("PSTN"). End devices may include any type of smart phone, cellular phone, any computing device executing a communication application, a smart automobile console, and advanced phone devices with additional functionality. Moreover, a subscriber of the UC system may use more than one end device and/or communication application for facilitating various modes of communication with other subscribers. End devices may also include various peripherals coupled to the end devices through wired or wireless means (e.g. USB connection, Bluetooth® connection, etc.) to facilitate different aspects of the communication.

UC Network(s) 110 includes a number of servers performing different tasks. For example, UC servers 114 provide registration, presence, and routing functionalities. Routing functionality enables the system to route calls to a user to anyone of the client devices assigned to the user based on default and/or user set policies. For example, if the user is not available through a regular phone, the call may be forwarded to the user's cellular phone, and if that is not answering a number of voicemail options may be utilized. Since the end devices can handle additional communication modes, UC servers 114 may provide access to these additional communication modes (e.g. instant messaging, video communication, etc.) through access server 112. Access server 112 resides in a perimeter network and enables connectivity through UC network(s) 110 with other users in one of the additional communication modes. UC servers 114 may include servers that perform combinations of the above described functionalities or specialized servers that only provide a particular functionality. For example, home servers providing presence functionality, routing servers providing routing functionality, rights management servers, and so on. Similarly, access server 112 may provide multiple functionalities such as firewall protection and connectivity, or only specific functionalities.

Audio/Video (A/V) conferencing server 118 provides audio and/or video conferencing capabilities by facilitating those over an internal or external network. Mediation server 116 mediates signaling and media to and from other types of networks such as a PSTN or a cellular network (e.g. calls through PBX 124 or from cellular phone 122). Mediation server 116 may also act as a Session Initiation Protocol (SIP) user agent.

In a UC system, users may have one or more identities, which is not necessarily limited to a phone number. The identity may take any form depending on the integrated networks, such as a telephone number, a Session Initiation Protocol (SIP) Uniform Resource Identifier (URI), or any other identifier. While any protocol may be used in a UC system, SIP is a commonly used method.

SIP is an application-layer control (signaling) protocol for creating, modifying, and terminating sessions with one or more participants. It can be used to create two-party, multiparty, or multicast sessions that include Internet telephone calls, multimedia distribution, and multimedia conferences. SIP is designed to be independent of the underlying transport layer.

SIP clients may use Transport Control Protocol ("TCP") to connect to SIP servers and other SIP endpoints. SIP is primarily used in setting up and tearing down voice or video calls. However, it can be used in any application where session initiation is a requirement. These include event subscription and notification, terminal mobility, and so on. Voice and/or video communications are typically done over separate session protocols, typically Real-time Transport Protocol ("RTP").

Contact information merger and duplicate resolution may be performed by one or more servers of the UC system by accessing in network and out-of-network data sources storing contact data for various communication services and retrieving contact information. The server may then create contact objects for each retrieved contact. This may be followed by determination of distinct contact entities and their corresponding contact objects (which may be multiple for each contact entity). The contact objects may be aggregated for each contact entity resolving duplicate information conflicts and creating a contact model for each contact entity. The model may be updated dynamically when a change is detected for any of the contact objects such that the subscriber has access to up-to-date contact information across platforms.

While the example system in FIG. 1 has been described with specific components such as mediation server, A/V server, and similar devices, embodiments are not limited to this system of the example components and configurations. An enhanced communication system facilitating multimodal contact information management may be implemented in other systems and configurations employing fewer or additional components. Furthermore, such systems do not have to be enhanced communication systems integrating various communication modes. Embodiments may also be implemented in systems facilitating different communication modes distinctly by coordinating implementation of the rules across different communication modes using the principles described herein.

Figure 2:
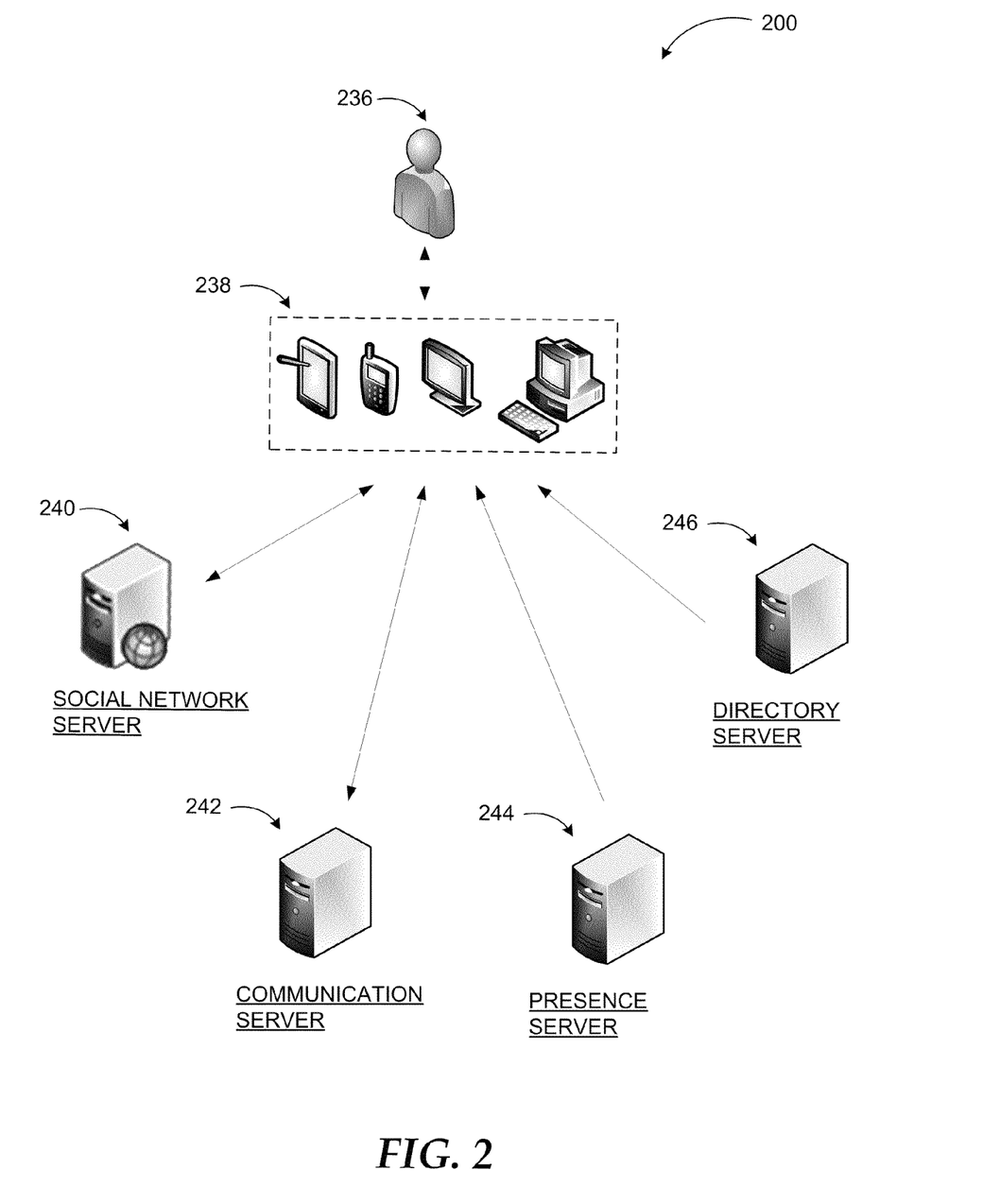
FIG. 2 is a conceptual diagram illustrating a basic example system for managing merger and duplicate resolution of contact information across different systems.

FIG. 2 includes conceptual diagram 200 illustrating a basic example system for managing merger and duplicate resolution of contact information across different systems. While a system according to embodiments is likely to include a number of servers and services such as those illustratively discussed in FIG. 1, only those relevant to embodiments are shown in FIG. 2.

Contact information for a subscriber 236 may first be computed based on information from a variety of sources such as organizational contacts information from directory server 246. This information is typically static, and may include organizational hierarchy, functional hierarchy, addresses, phone numbers, titles, and similar information for contacts. Other contact stores such as various address books maintained by servers like communication server 242 (e.g. personal address book associated with an email application), presence server 244, and social networking server 240 may be used as information source as well.

The collected information may be processed as described above and dynamically updateable contact models may be employed to provide subscriber 236 an aggregated contact list through any one of their client devices 238. Furthermore, third-party systems may be enabled to access the contact models and provide a dynamically aggregated view of the "merged" contacts. According to some embodiments, the external or third-party systems may access the contact models using a predefined key (e.g. a SIP URI, an email address, a phone number, etc.) and build user interface components (e.g. contact card, contact list, search, etc.) to enable users to easily find, access, and edit contact information. Such applications/devices may decide to display the aggregated contact data and/or contact data from a specific store.

Figure 3:
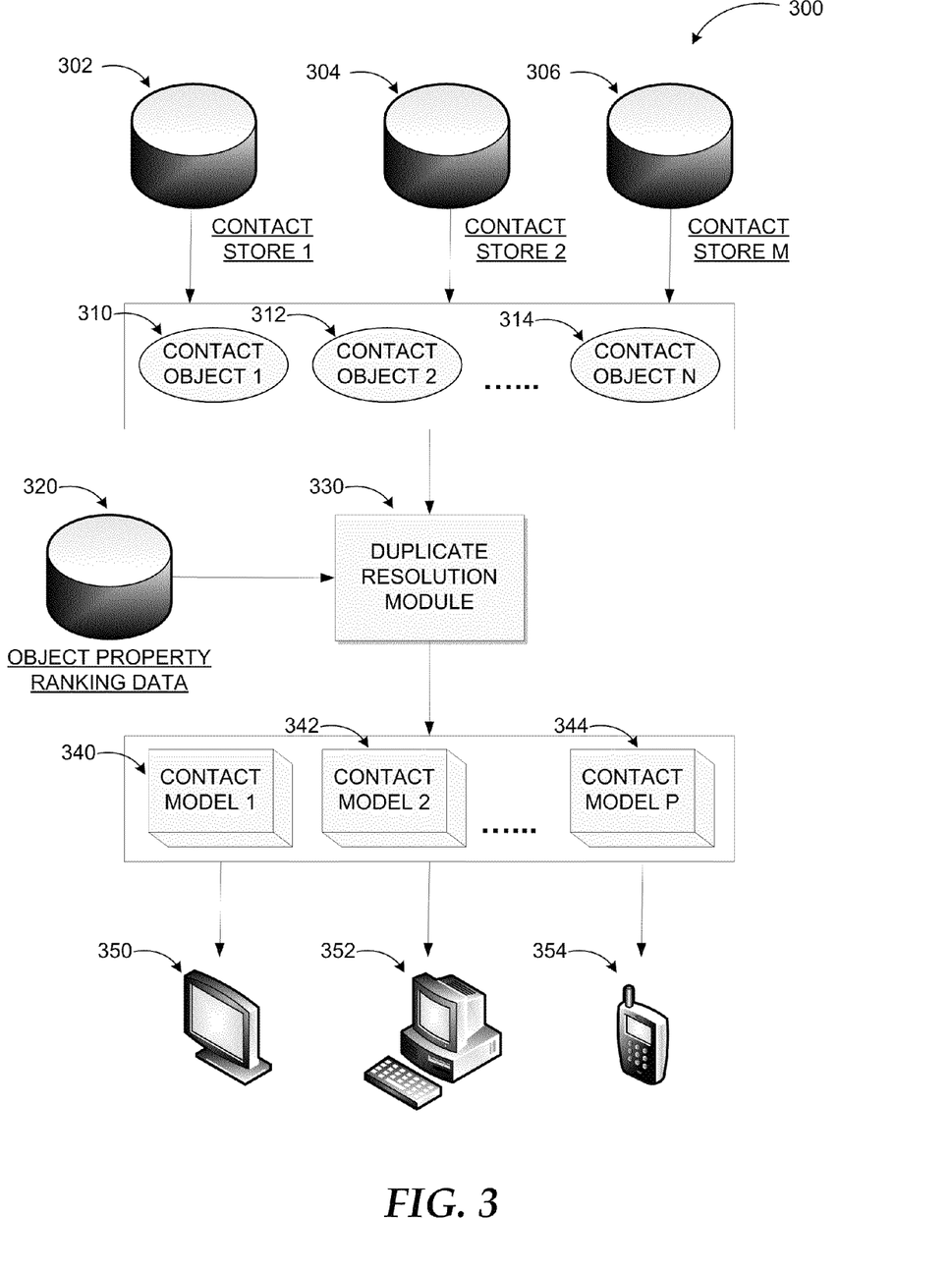
FIG. 3 illustrates major components and actions in an enhanced communication system for facilitating management of merger and duplicate resolution of contact information according to embodiments.

FIG. 3 illustrates diagram 300 of major components and actions in an enhanced communication system for facilitating management of merger and duplicate resolution of contact information according to embodiments. A system according to embodiments may collect contact information from a variety of sources. For example, first contact store 302 may be a contact repository for a social networking site. Second contact store 304 may be a personal contact repository such as an email application address book. Mth contact store 306 may be an organizational repository such as a directory server. Other resources may include, but are not limited to, presence servers, collective databases, and similar ones.

The contact data from each of the resources is retrieved as groups of metadata for contact entities (e.g. persons, groups, non-human entities, etc.). A contact object may be created for each contact entity from each contact store such as first contact object 310, second contact object 312, through nth contact object 312. The contact objects may have various attributes depending on attribute categories of their particular contact store. For example, the contact objects may include properties representing both dynamic (e.g. presence, location, etc.) and static (photo, display name, email addresses, IM addresses, phone numbers, etc.) information. The system may receive notifications from the data sources whenever contacts are added, deleted, and/or metadata is changed. The system may then update its contact objects based on these notifications. Alternatively, the system may query the contact stores regularly or on-demand to determine any changes in the contact information.

Some contact objects may be duplicates of each other. Duplicate resolution module 330 may aggregate the information from contact objects and create a contact model for each distinct contact entity. First contact model 340, second contact model 342, through pth contact model 344 may be created in a two-step process. At first step, duplicate contacts across multiple stores may be resolved by matching contact objects based on one or more properties or keys. Properties used for duplicate contact resolution may include display name, email addresses, text messaging addresses, phone numbers, and similar attributes. According to some embodiments, the properties may be assigned weights, and an overall weight factor for each contact object may be used to determine whether multiple contact objects represent the same contact entity. For example, the system may assign weights to test message addresses and email addresses. If two contact entries have the identical text messaging and email addresses, then the probability that these two entries represent the same entity is higher than contact entries where only the email addresses match and the text message addresses do not.

The data from duplicate contacts may be aggregated by applying a fallback logic and forming a single contact model. For each contact property, the fallback logic may rank the data sources based on factors like reliability, last modified time, and comparable criteria. The ranking of data sources may be customized based on the end user needs and goals, as well as enterprise rules. The system may then select a property value from the highest ranked data source. If the property value is empty or unavailable for the highest ranked data source, then the system may obtain the value from the next ranked data source; and so on. Similarly, conflicting information between two data sources may be resolved through the ranking system and/or by creating additional properties. For example, if two contact objects for the same entity include two different email addresses, the system may retain the address from the higher ranked data source or retain both addresses assigning the lower ranked address to a newly created property (e.g. "email 2").

Duplicate resolution module 330 may utilize an object property ranking data store 320 for storing and retrieving ranked data. Moreover, the contact models may dynamically update when there is a change any of the referenced contact objects or when a new contact object is linked to a contact model. Each contact model may be displayed in variety of devices including a monitor 350, a personal computer 352, and a cellular phone 354. Each contact model represents contact information for individual contact entities with aggregated information from multiple contact data stores. The contact models may be stored, locally, on a client machine, or remotely, on a server. Individual aggregation of duplicate contact objects may be based on user prompt in the absence of any automated scheme.

The above discussed scenarios, example systems, contact information, or applications are for illustration purposes. Embodiments are not restricted to those examples. Other forms of contact profiles, contact objects, and models may be used in implementing the management of contact information in a similar manner using the principles described herein.

Figure 4:
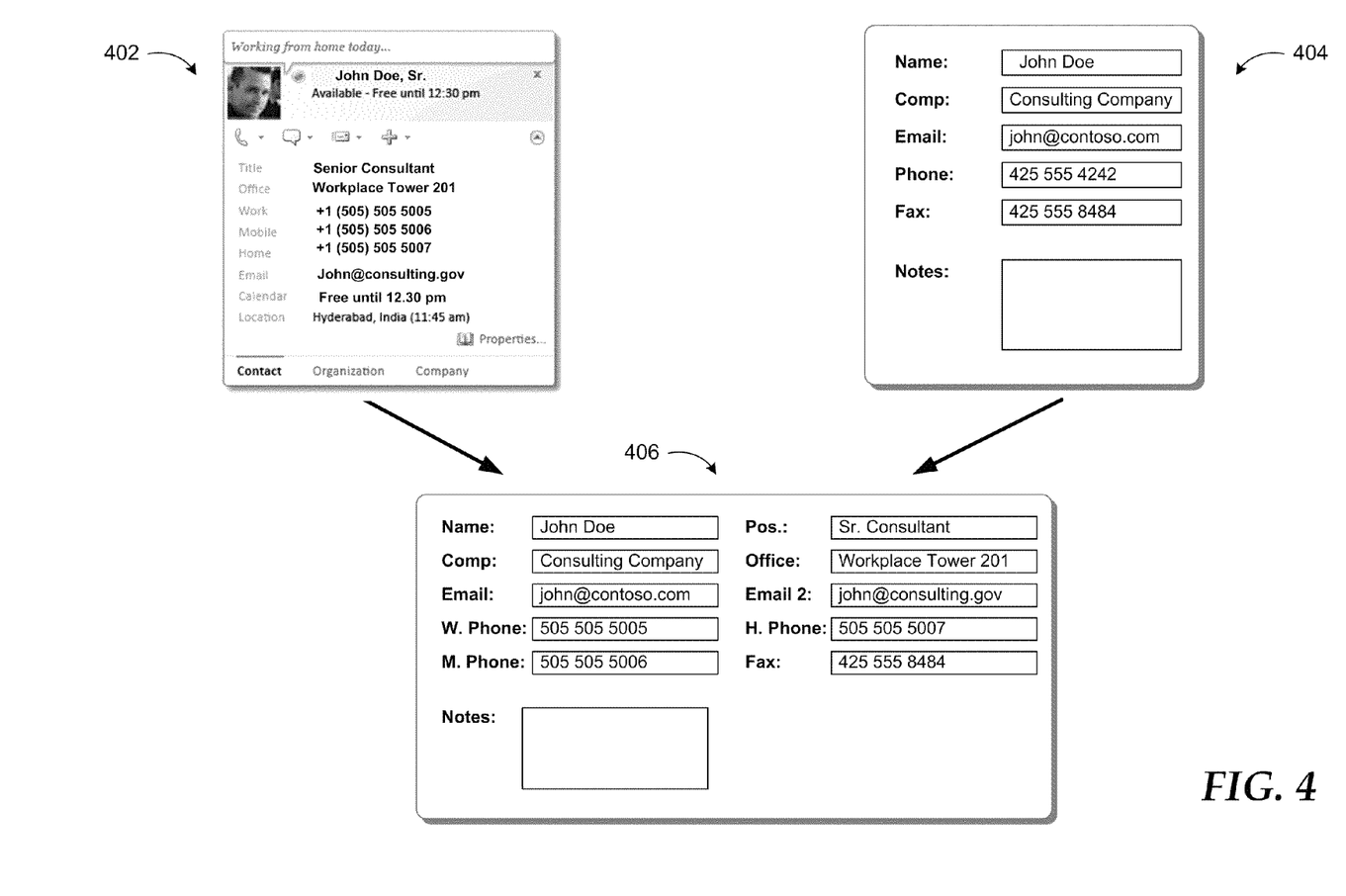
FIG. 4 illustrates how different contact information may be merged into a single contact model using example user interfaces in a system according to embodiments.

FIG. 4 illustrates how different contact information may be merged into a single contact model using example user interfaces in a system according to embodiments. As illustrated in FIG. 4, contact information from two different contact data stores for the same contact entity may be displayed (and stored) in different manners. Contact entity 402 may be from an enterprise communication system data store such as a unified communications contact card and include static as well as dynamic information about the contact. Contact entity 404 includes static information with fewer properties. In addition, the phone and the fax numbers for the contact are different in each data source.

A system according to embodiments may create contact objects for each of the entities using the properties contained in the contact data. Then, the system may match the two objects based on the entity's name key. The system may assign a higher ranking to the contact entity 402 because of its reliability (enterprise data source), update status, or similar criteria. Then contact model 406 may be created consolidating the information from the two sources. Matching properties may be retained as is. Non-overlapping information such as office or position of the contact may be included in the model as distinct properties. In case of conflicting information such as the email addresses or phone numbers, either the higher ranked property (e.g. phone number) may be adopted or both properties may be retained assigning the lower ranked property (e.g. email address from contact entity 404) a new property name.

Figure 5:
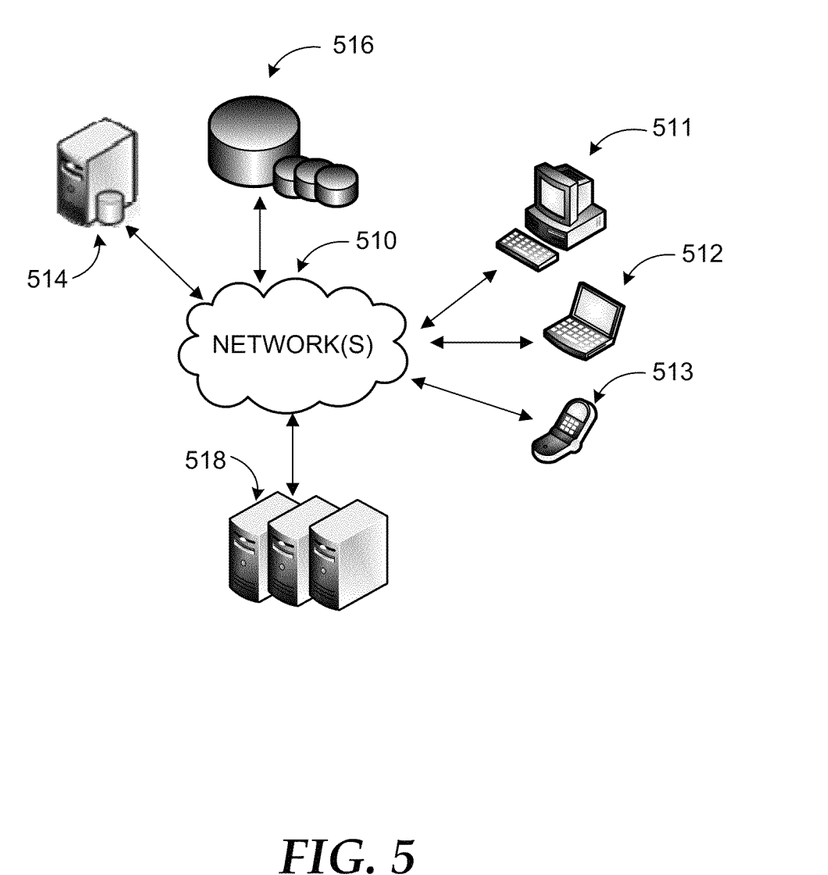
FIG. 5 is a networked environment, where a system according to embodiments may be implemented.

FIG. 5 is an example networked environment, where embodiments may be implemented. An enhanced communication system providing communication services including contact information management capability may be implemented via software executed over one or more servers 518 such as a hosted service. The system may facilitate communications between client applications on individual computing devices such as a smart phone 513, a laptop computer 512, and desktop computer 511 ('client devices') through network(s) 510.

As discussed above, modern communication technologies such as UC services enable subscribers to utilize a wide range of computing device and application capabilities in conjunction with communication services. This means, a subscriber may use one or more devices (e.g. a regular phone, a smart phone, a computer, a smart automobile console, etc.) to facilitate communications and multiple communication services with multiple contact lists. Contact information from such systems may be aggregated into a single, up-to-date contact list automatically reducing a need for the user to update contact information manually for each service they utilize.

Client devices 511-513 are used to facilitate communications through a variety of modes between subscribers of the communication system. One or more of the servers 518 may be used to manage contact information as discussed above. Contact management information may be stored in one or more data stores (e.g. data store 516), which may be managed by any one of the servers 518 or by database server 514.

Network(s) 510 may comprise any topology of servers, clients, Internet service providers, and communication media. A system according to embodiments may have a static or dynamic topology. Network(s) 510 may include a secure network such as an enterprise network, an unsecure network such as a wireless open network, or the Internet. Network(s) 510 may also coordinate communication over other networks such as PSTN or cellular networks. Network(s) 510 provides communication between the nodes described herein. By way of example, and not limitation, network(s) 510 may include wireless media such as acoustic, RF, infrared and other wireless media.

Many other configurations of computing devices, applications, data sources, and data distribution systems may be employed to implement a communication system with contact information management. Furthermore, the networked environments discussed in FIG. 5 are for illustration purposes only. Embodiments are not limited to the example applications, modules, or processes.

Figure 6:
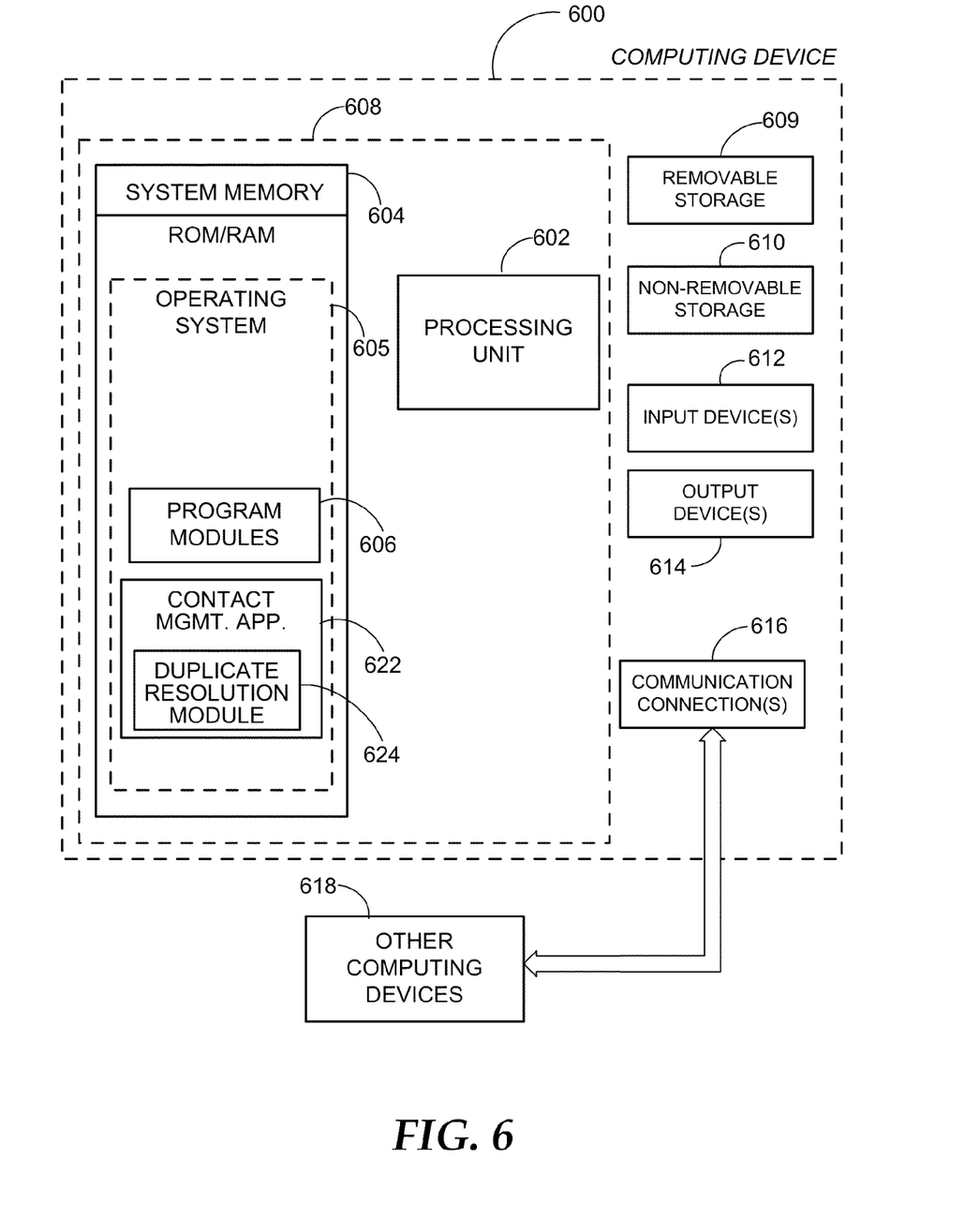
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be a contact information management server as part of an enhanced communication system and include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS operating systems from MICROSOFT CORPORATION of Redmond, Wash. The system memory 604 may also include one or more software applications such as program modules 606, contact management application 622, and duplicate resolution module 624.

Contact management application 622 may be part of a service that facilitates communication through various modalities between client applications, servers, and other devices. Duplicate resolution module 624 may enable aggregation and duplicate resolution of contact information retrieved from a variety of contact data stores across different systems. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wireless network in a distributed computing environment, a satellite link, a cellular link, and comparable mechanisms. Other devices 618 may include computer device(s) that execute communication applications, other directory or policy servers, and comparable devices. Communication connection(s) 616 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
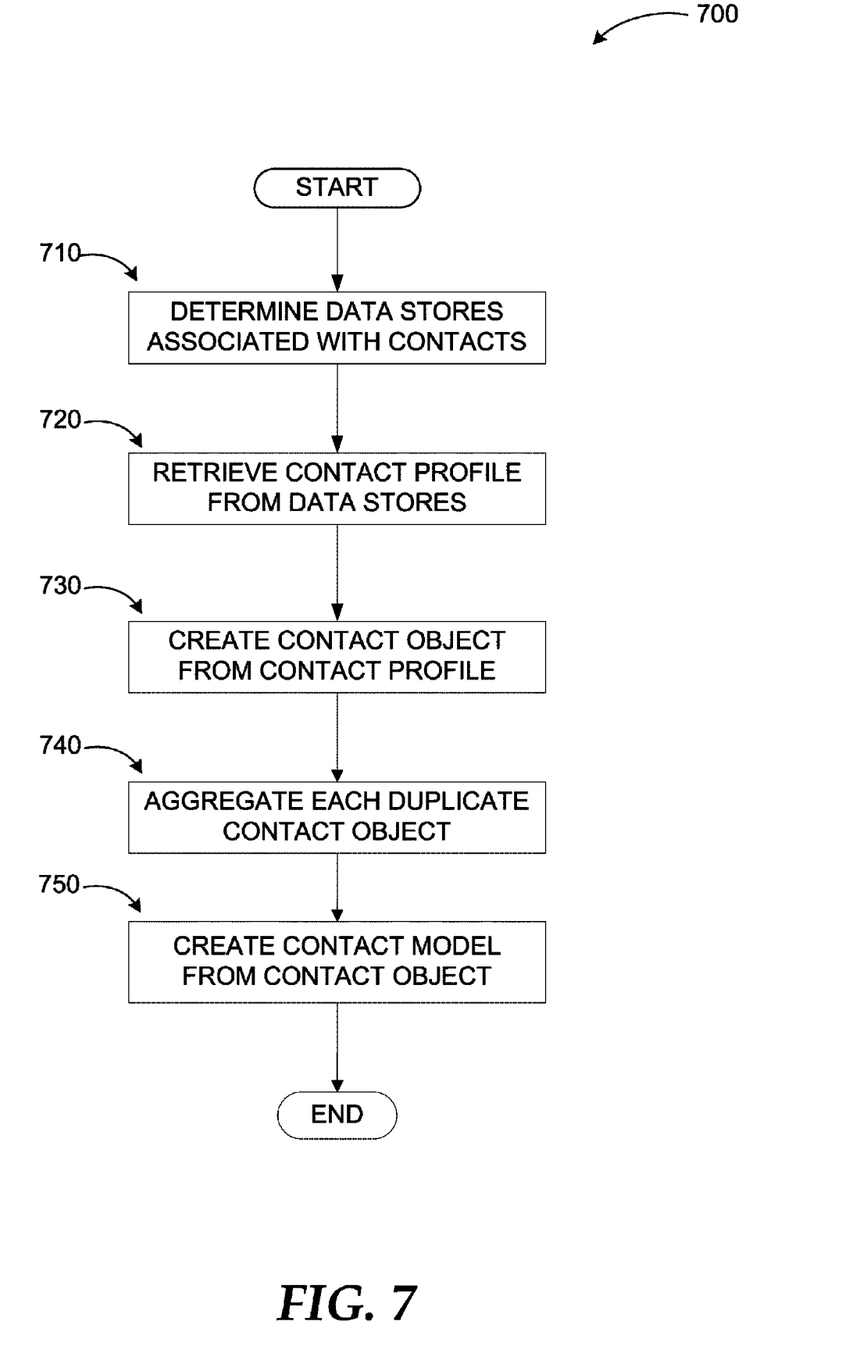
FIG. 7 illustrates a logic flow diagram for a process of managing contact information in an enhanced communication system according to embodiments.

FIG. 7 illustrates a logic flow diagram of process 700 for managing contact information according to embodiments. Process 700 may be implemented as part of a communication system that facilitates multiple contact data stores.

Process 700 begins with operation 710, where data stores associated with contacts are determined. As discussed previously, data stores may be social networking depositories, local depositories (such as email address books), organization directories, and similar ones.

At operation 720, contact profiles from the data stores are retrieved. These profiles (or entities) may contain information and attributes associated with various contacts. The attributes in the contact profiles may be used to populate contact objects at operation 730.

Duplicate contact objects may be aggregated at operation 740 by determining distinct contact entities, one or more contact objects associated with those distinct contact entities and resolving duplicate information conflicts. Weighting of properties and ranking of data sources may be employed in aggregating the data. Contact models for each distinct contact entity may be created at operation 750 using the aggregated contact objects. The contact models represent distinct contact profiles across multiple contact data stores.

The operations included in process 700 are for illustration purposes. A contact management service according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for managing contact information, the method comprising:
    determining a plurality of data stores associated with a plurality of contacts;
    retrieving a plurality of contact profiles from the plurality of the data stores; and
    creating a contact model for each distinct contact at a contact management application by:
        creating a contact object corresponding to each contact profile;
        determining duplicate contact objects based on contact attributes;
        aggregating the duplicate contact objects at a duplicate resolution module by one of: selecting a contact attribute from a higher ranked data store among the plurality of data stores and creating a new contact attribute for conflicting duplicate contact attributes from different data stores, based on a ranking of the data stores, the ranking based on at least one from a set of: a reliability of each communication service, an update status of each data store, and user feedback;
        creating a contact model for each aggregated set of contact objects;
        storing the contact model for access by a user at an object property ranking data store on one of: a client device associated with the user and a server; and
        updating the contact modes in response to one of: a notification of a change to a contact entity from a communication service, a response to a query for a status of a contact entity from one of the data stores, and a status update from a presence server.

2. A communication system for managing contact information, the system comprising:
    a server configured to:
        determine a plurality of data stores associated with a plurality of contact entities across different communication services associated with a user;
        retrieve the plurality of contact entities from the plurality of data stores;
        create a plurality of contact models corresponding to distinct contact entities at a contact management application by:
            creating a contact object storing attributes for each contact entity;
            determining duplicate contact objects based on one or more matching attributes;
            aggregating duplicate contact objects at a duplicate resolution module by one of selecting a contact attribute from a higher ranked data store among the plurality of data stores and creating a new contact attribute for conflicting duplicate contact attributes from different data stores, based on a weighted ranking of the data stores, wherein the data stores are ranked based on at least one from a set of: a reliability of each communication service, an update status of each data store, and user feedback;
            storing the contact models for access by the user at an object property ranking data store on one of: a client device associated with the user and a server;
        enable the user to access the contact models using a key including at least one of: an e-mail address, an Instant Message (IM) address, a phone number, and a system generated General User Identifier (GUID);
        provide at least one user interface component to enable the user to find, access, and edit the contact models; and
        display one of: the contact models and the contact entities for one of the data stores on a client device.

3. The method of claim 1, wherein the data stores include at least one from a set of: a social networking directory, a custom directory, a personal directory, and an organization directory.

4. The method of claim 1, wherein the contact profiles include at least one of: dynamic contact information and static contact information.

5. The method of claim 1, wherein creating the contact object further comprises:
    retrieving at least one contact attribute for each contact profile; and storing the at least one contact attribute in the contact object.

6. The method of claim 1, further comprising:
updating the contact objects in response to receiving an update notification from a data store.

7. The method of claim 1, wherein creating the contact model further comprises:
determining duplicate contact objects based on at least one matching contact attribute.

8. The system of claim 2, wherein the contact entities include one of: a person, a conference room, and a network resource.

9. The system of claim 2, further comprising a presence server for providing presence information associated with at least a portion of the contact entities, wherein the server is further configured to update the contact models in response to one of: a notification of a change associated with one of the contact entities from a communication service, a response to a query associated with one of the contact entities from a communication service, and an updated presence information associated with one of the contact entities from the presence server.

10. The system of claim 2, wherein aggregating duplicate contact objects comprises:
retaining attributes of contact objects from a higher ranked data store;
assigning new attributes to non-overlapping attributes of contact objects from a lower ranked data store; and
removing conflicting attributes of contact objects from a lower ranked data store.

11. The system of claim 2, wherein duplicate contact objects are determined based on matching attributes according to a weighted order of: a name, an email address, an instant messaging address, a phone number, and an organization associated with each contact entity.

12. The method of claim 4, wherein the dynamic contact information includes presence information.

13. The method of claim 4, wherein the static contact information includes at least one from a set of: a name, an address, a role, an organization, an office, a department, a Session Initiation Protocol (SIP) address, a photo, an email address, an Instant Message (IM) address, and at least one phone number.

14. The method of claim 6, wherein the contact object is updated in response to at least one from a set of: an addition of a contact profile, a deletion of a contact profile, and a modification of a contact profile metadata in one of the data stores.

15. The method of claim 9, wherein aggregating the duplicate contact objects further comprises:
selecting a matching contact object attribute based on a weighted ranking of the contact attributes.

* * * * *